(12) United States Patent
Toepker

(10) Patent No.: US 9,242,306 B2
(45) Date of Patent: Jan. 26, 2016

(54) CAPACITOR DISCHARGE WELD FOR CONNECTING TUBULAR TWIST BEAM PROFILES TO CAST TRAILING ARM VIA ADAPTER RING

(71) Applicant: Dieter Toepker, Glienicke-Nordbahn (DE)

(72) Inventor: Dieter Toepker, Glienicke-Nordbahn (DE)

(73) Assignee: Magna International Inc., Aurora, Ontario (CA)

( * ) Notice: Subject to any disclaimer, the term of this patent is extended or adjusted under 35 U.S.C. 154(b) by 389 days.

(21) Appl. No.: 13/932,527

(22) Filed: Jul. 1, 2013

(65) Prior Publication Data

US 2013/0292364 A1    Nov. 7, 2013

Related U.S. Application Data

(62) Division of application No. 12/524,187, filed as application No. PCT/CA2008/000214 on Feb. 5, 2008, now Pat. No. 8,475,075.

(60) Provisional application No. 60/899,843, filed on Feb. 6, 2007.

(51) Int. Cl.
| | |
|---|---|
| B23K 26/32 | (2014.01) |
| B23K 35/30 | (2006.01) |
| B23K 11/14 | (2006.01) |
| B23K 11/20 | (2006.01) |
| B23K 9/10 | (2006.01) |
| B23K 11/26 | (2006.01) |
| B23K 35/22 | (2006.01) |
| B60G 21/05 | (2006.01) |

(Continued)

(52) U.S. Cl.
CPC ............. *B23K 9/1081* (2013.01); *B23K 11/14* (2013.01); *B23K 11/20* (2013.01); *B23K 11/26* (2013.01); *B23K 26/20* (2013.01); *B23K 26/32* (2013.01); *B23K 35/22* (2013.01); *B23K 35/30* (2013.01); *B60G 21/051* (2013.01); *B23K 11/16* (2013.01); *B60G 2200/21* (2013.01); *B60G 2206/20* (2013.01); *B60G 2206/8201* (2013.01); *Y10T 403/478* (2015.01)

(58) Field of Classification Search
CPC ........ B23K 26/32; B23K 35/30; B23K 11/14; B23K 11/16; B23K 11/20
USPC ............ 219/108, 112, 113, 59.1, 91.2, 91.23, 219/93, 95, 96, 121.64; 228/175
See application file for complete search history.

(56) References Cited

U.S. PATENT DOCUMENTS

| | | |
|---|---|---|
| 1,630,037 A | 5/1927 | Stresau |
| 1,987,341 A | 1/1935 | Kachel |

(Continued)

FOREIGN PATENT DOCUMENTS

| | | |
|---|---|---|
| DE | 4333283 A1 | 3/1994 |
| EP | 0797064 A2 | 9/1997 |

(Continued)

*Primary Examiner* — Samuel M Heinrich
(74) *Attorney, Agent, or Firm* — Dickinson Wright PLLC

(57) ABSTRACT

A suspension component for a vehicle includes a cast iron body, a high strength steel tube and an adapter ring. The adapter ring includes a protrusion engaged with a face of the cast iron body. The protrusion is heated to a plasticized state as a capacitor is discharged through the protrusion and the face. The adapter ring is welded to the body upon cooling of the adapter ring. The high strength steel tube is fixed to the adapter ring.

14 Claims, 3 Drawing Sheets

(51) Int. Cl.
*B23K 26/20* (2014.01)
*B23K 11/16* (2006.01)

(56) References Cited

U.S. PATENT DOCUMENTS

| | | | |
|---|---|---|---|
| 3,436,806 A | 4/1969 | Supan | |
| 4,096,787 A | 6/1978 | Sandau et al. | |
| 4,273,983 A | 6/1981 | Ogawa et al. | |
| 4,404,458 A | 9/1983 | Tange | |
| 4,672,164 A * | 6/1987 | Devletian | B23K 9/201 |
| | | | 219/117.1 |
| 4,708,282 A | 11/1987 | Johnsen et al. | |
| 4,765,530 A | 8/1988 | Dang et al. | |
| 4,885,452 A | 12/1989 | Amos et al. | |
| 5,368,223 A | 11/1994 | Chevrel et al. | |
| 5,398,789 A * | 3/1995 | Handke | F16F 9/325 |
| | | | 188/266.6 |
| 5,457,301 A | 10/1995 | Wilson | |
| 5,942,135 A * | 8/1999 | Rau | B22F 7/004 |
| | | | 219/117.1 |
| 6,086,162 A | 7/2000 | Pinch et al. | |
| 6,298,962 B1 | 10/2001 | Kato et al. | |
| 6,387,535 B1 | 5/2002 | Mantel | |
| 6,642,471 B2 | 11/2003 | Imai et al. | |
| 7,140,530 B2 | 11/2006 | Durand et al. | |
| 7,266,883 B2 | 9/2007 | Schempp et al. | |
| 2006/0033304 A1 | 2/2006 | Saieg et al. | |

FOREIGN PATENT DOCUMENTS

| | | |
|---|---|---|
| EP | 1652613 A2 | 5/2006 |
| FR | 2889471 | 9/2007 |
| GB | 1340085 A | 12/1973 |
| WO | 2007095983 A1 | 8/2007 |

\* cited by examiner

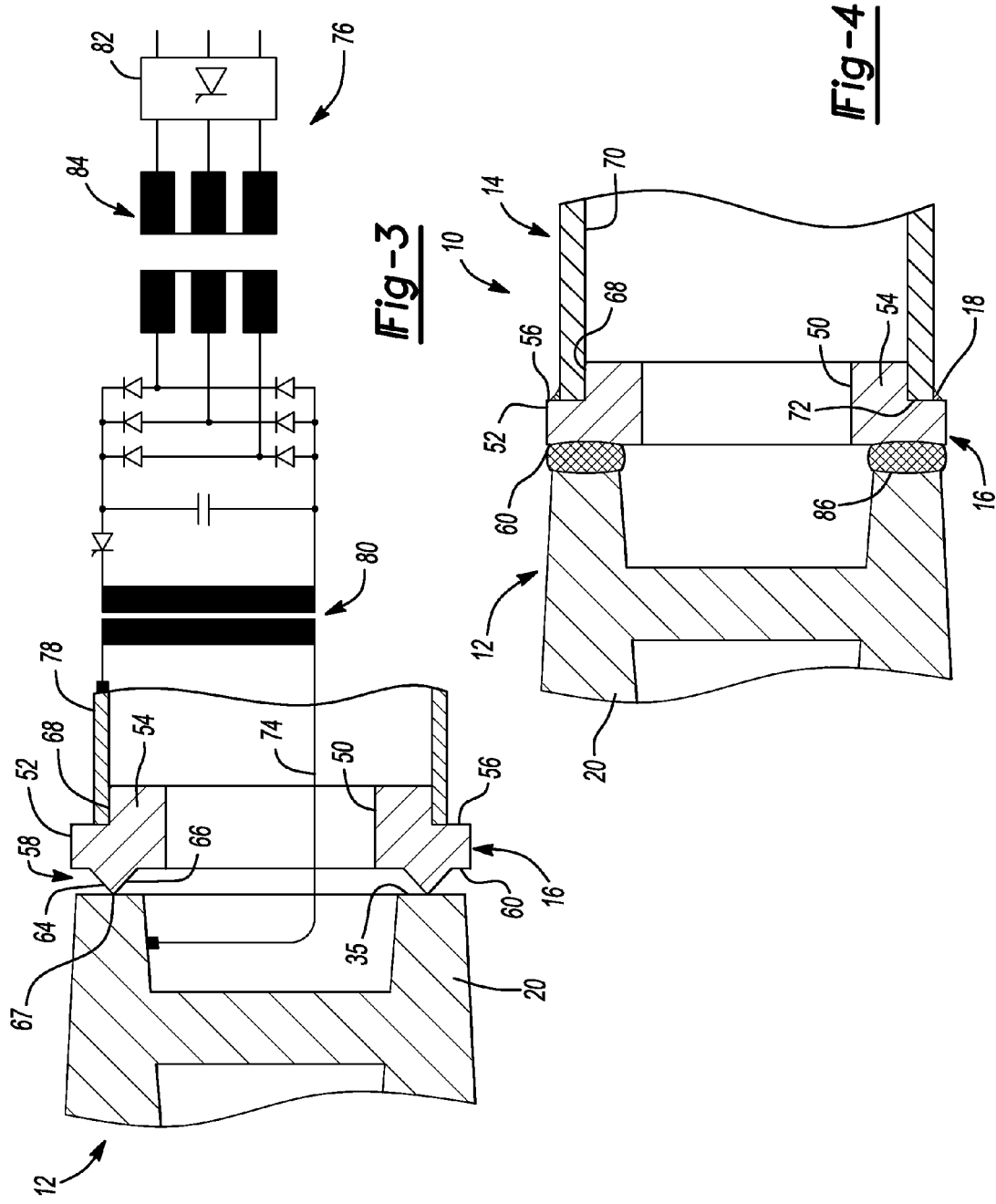

CAPACITOR DISCHARGE WELD FOR CONNECTING TUBULAR TWIST BEAM PROFILES TO CAST TRAILING ARM VIA ADAPTER RING

CROSS REFERENCE TO RELATED APPLICATIONS

This U.S. Divisional Patent Application claims priority to U.S. application Ser. No. 12/524,187 filed Jul. 23, 2009 entitled "Capacitor Discharge Weld For Connecting Tubular Twist Beam Profiles To Cast Trailing Arm Via Adapter Ring" which claims priority to International Application Serial Number PCT/CA2008/000214 filed Feb. 5, 2008 which claims priority to U.S. Provisional Application Ser. No. 60/899,843 filed Feb. 6 2007, the entire disclosures of the applications being considered part of the disclosure of this application, and hereby incorporated by reference.

BACKGROUND

The present disclosure generally relates to connecting components constructed from dissimilar materials. More particularly, the present disclosure relates to a capacitor discharge welding operation for connecting high strength steel tubes to cast iron members using an adapter ring.

Designers and engineers of vehicles have struggled with the challenge of connecting components constructed from different materials for quite some time. This challenge arises frequently because certain components lend themselves to being constructed from certain types of materials more than others. In particular, vehicle suspension components such as steering knuckles, brake spiders and trailing arms often have relatively complex shapes that are much more easily cast than produced by other manufacturing processes. Cast iron is a typical material used due to its low cost and relatively high strength. On the other hand, more simple structural members may be formed from rolled sheet or extruded tubes. Components having planar sheet or tubular profiles may be constructed from a number of materials including low carbon steel, high strength micro-alloyed steel and aluminum. Other components may be constructed using other processes such as forging. Forged components may be constructed from yet another set of engineering materials.

Difficulties arise when attempting to structurally interconnect components made from the various materials. In particular, welding cast iron to steel typically results in a brittle weld connection due to the high carbon content of the cast iron. A brittle weld is created because the typical weld process of MIG welding forms a nugget-type or fusion weld. During MIG welding, the interface between the two components to be welded is heated to the melting point of both workpieces. After cooling and recombination of material, a nugget forms. The nugget contains all of the alloys of the two materials. Some of these combinations may have undesirable characteristics contributing to the brittle weld connection. In sum, the AC welding operation imparts too much heat to the welded components Other processes to join dissimilar materials, specifically cast iron and steel, have been utilized. In one example, a magnetic arc system begins by engaging a face of a cast iron component with a face of a high strength steel component. Current is passed through both pieces. The workpieces are moved apart and an electric arc is formed. The electric arc is chased by a magnetic field. The ends of the components in contact with the electric arc heat up to the point of melting. The components are then pushed back together at a predetermined load to form the joint. While this method may produce desirable joints, it is very expensive due to the very high cost of the machines cooperating with one another to define the magnetic arc system. Accordingly, improvements in the field of interconnecting structural components having different materials are still desirable.

SUMMARY

A suspension component for a vehicle includes a cast iron body, a high strength steel tube and an adapter ring. The adapter ring includes a protrusion engaged with a face of the cast iron body. The protrusion is heated to a plasticized state as a capacitor is discharged through the protrusion and the face. The adapter ring is welded to the body upon cooling of the adapter ring. The high strength steel tube is fixed to the adapter ring.

DRAWINGS

The drawings described herein are for illustration purposes only and are not intended to limit the scope of the present disclosure in any way.

FIG. 3 is a fragmentary cross-sectional side view of a cast iron component arranged for capacitor discharge welding to an adapter ring; and FIG. 4 is a cross-sectional side view of the suspension assembly after capacitor discharge welding.

DETAILED DESCRIPTION

Figure 1:
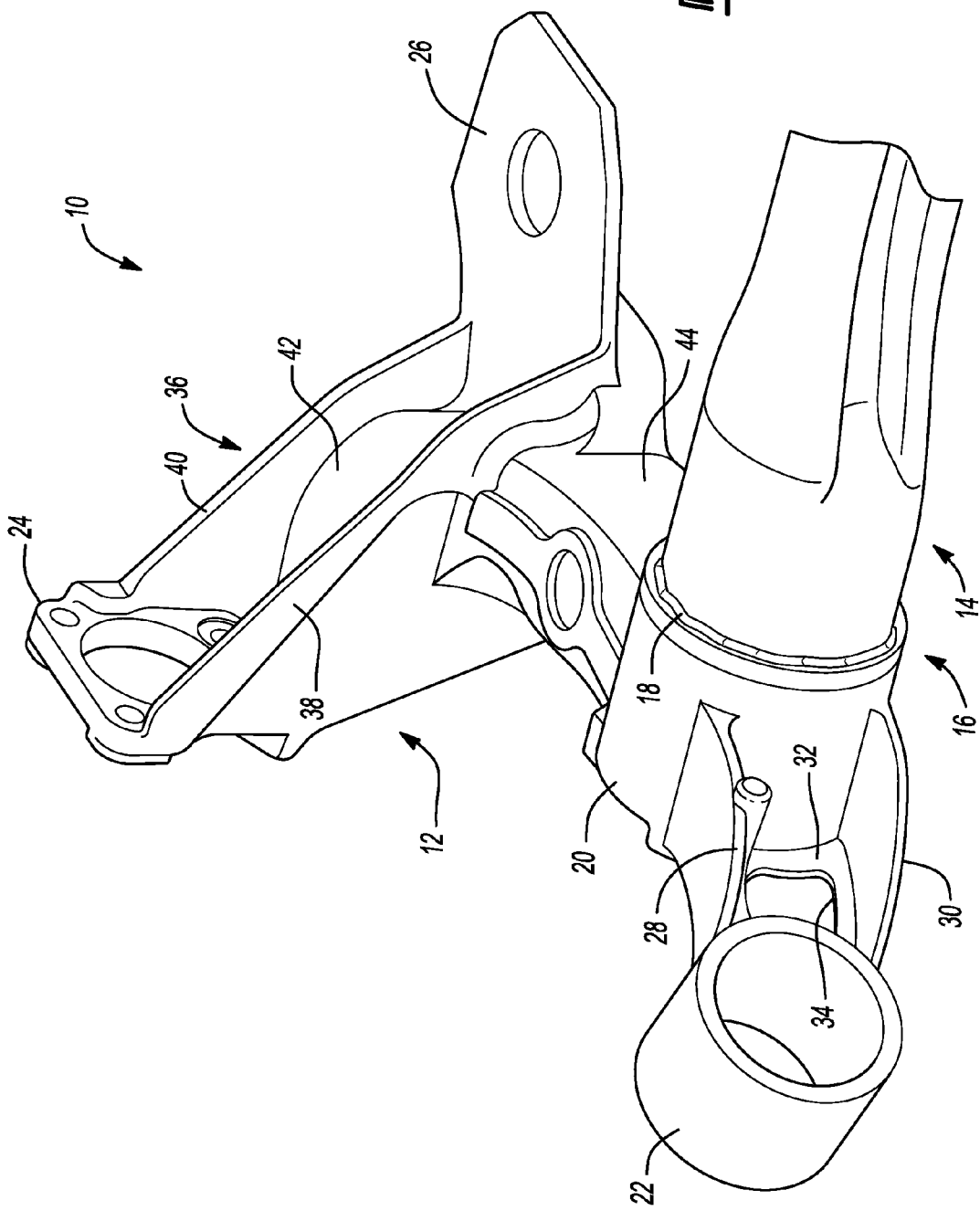
FIG. 1 is a fragmentary perspective view of a suspension assembly of the present disclosure.

The following description is merely exemplary in nature and is not intended to limit the present disclosure, application, or uses. It should be understood that throughout the drawings, corresponding reference numerals indicate like or corresponding parts and features.

Figure 2:
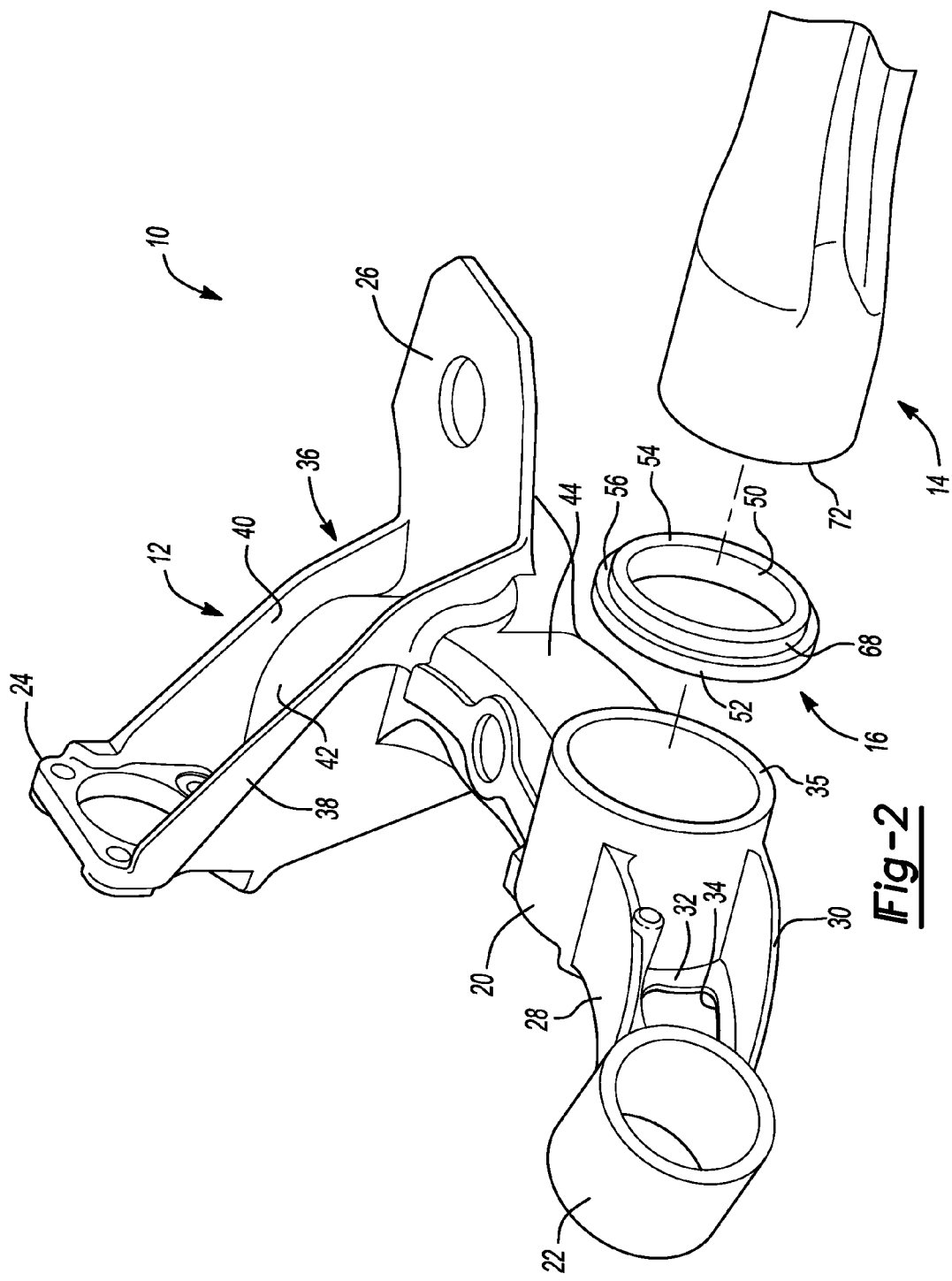
FIG. 2 is a fragmentary exploded perspective view of a suspension assembly according to the present disclosure.

FIGS. 1 and 2 depict a suspension assembly 10 having a trailing arm 12, a tube 14 and an adapter ring 16. As will be described in greater detail below, adapter ring 16 is constructed from a mild or low carbon steel material that is fixed to trailing arm 12 via capacitor discharge welding. Trailing arm 12 is constructed from a cast iron material. Adapter ring 16 is subsequently fixed to tube 14. Tube 14 may be constructed from a high strength steel such as 22MnB5. Tube 14 may also be constructed from high strength steels including ferrite, bainite or martensite. Tube 14 is fixed to adapter ring 16 via a weld 18.

Trailing arm 12 includes a cylindrically shaped central boss 20, an end boss 22, a first flange 24 and a second flange 26. Central boss 20 and end boss 22 are interconnected by a first rib 28, a spaced apart and substantially parallel second rib 30 and a third rib 32. Third rib 32 interconnects first rib 28 and second rib 30. An aperture 34 extends through third rib 32 to reduce the weight of trailing arm 12. Central boss 20 terminates at a substantially planar face 35.

On the opposite end of trailing arm 12, first flange 24 and second flange 26 extend substantially perpendicular to one another. A bracket 36 supports first flange 24 and second flange 26. More particularly, bracket 36 includes first and second sidewalls 38,40 extending between first flange 24 and second flange 26. A center panel 42 interconnects first sidewall 38 and second sidewall 40.

A beam portion 44 interconnects first sidewall 38 and central boss 20. Due to the relatively complex geometry of trailing arm 12, it is beneficial to use a casting process to economically form this suspension component. Although not explicitly shown in the figures, it should be appreciated that trailing arm 12 is configured to connect to other vehicle components (not shown) at end boss 22, first flange 24 and second flange 26.

While certain component interconnections may be made with flanges and fasteners similar to the arrangement shown in relation to first flange 24, it may be beneficial to directly fix certain components of a vehicle to others. Component weight, cost and assembly time may be reduced by eliminating flanges, their associated fasteners and the time to install each fastener. As mentioned earlier, difficulties arise when components constructed from different materials are attempted to be directly joined. The capacitor discharge welding operation of the present disclosure overcomes these challenges.

FIGS. 2 and 3 depict adapter ring 16 as formed from a mild or low carbon steel having an aperture 50 extending therethrough. Adapter ring 16 includes a flange 52 and a pilot 54 integrally formed with one another. A land 56 is formed at the intersection of flange 52 and pilot 54. A projection 58 axially extends from a surface 60 of adapter ring 16. Surface 60 is substantially planar and extends parallel to land 56. Projection 58 is shaped as a substantially uninterrupted ring having a triangular cross section. The triangular cross section of projection 58 is defined at least in part by a first leg 64 and a second leg 66. Legs 64,66 extend from surface 60 and intersect at a contact ring 67. Contact ring 67 is in engagement with face 35 of trailing arm 12. An included angle between first leg 64 and second leg 66 is depicted in the Figures as being approximately ninety degrees. It should be appreciated that a projection having an included angle viewed in cross section ranging from thirty to ninety degrees is contemplated as part of the present disclosure. The configuration of projection 58 will provide an appropriate amount of electrical contact as well as plasticized material to form the weld joint.

Flange 52 has an outer diameter substantially similarly sized to the outer diameter of central boss 20. Pilot 54 includes an outer cylindrical surface 68 having a diameter smaller than the outer diameter defined by flange 52 but nearly identical in size to an inner cylindrical surface 70 of tube 14. Pilot 54 aligns tube 14 with trailing arm 12. After adapter ring 16 has been coupled to trailing arm 12, an end face 72 of tube 14 engages adapter ring 16 at land 56 prior to fixing tube 14 thereto.

As most clearly shown in FIG. 3, adapter ring 16 is coupled to trailing arm 12 prior to tube 14 being fixed to adapter ring 16. To perform the capacitor discharge welding operation, a first electrode 74 of a capacitor welding machine 76 passes through aperture 50 of adapter ring 16. First electrode 74 is electrically coupled to trailing arm 12 at a location proximate face 35. A second electrode 78 is electrically coupled to adapter ring 16. Second electrode 78 may be formed as a tubular structure shaped similarly to tube 14. By shaping second electrode 78 in this manner, an electrical path through projection 58 is formed. Furthermore, an axial force may be applied to second electrode 78 to engage projection 58 with face 35.

Adapter ring 16 is fixed to trailing arm 12 in a process where a capacitor 80 is charged to a voltage of approximately 3000 volts fed by a high-power thyrister 82 to the primary side of a specially designed impulse transformer 84. Upon capacitor discharge, the welding pulse generally yields a diffusion-type weld. Projection 58, beginning at contact ring 67, is heated to a plastic state and a mixing of the crystals from each material is evident in FIG. 4 at zone 86. A force continues to be applied to trailing arm 12 and adapter ring 16 such that the plasticized material is squeezed out from the contact area. Trailing arm 12 and adapter ring 16 are moved toward one another. The resulting contact area between the two components is forge welded. Due to the relatively low heat input and rapid cooling rates associated with capacitor discharge welding, the heat-affected zone is extremely small compared to other processes. This localized heating enables welding near heat-sensitive materials and results in little to no weld zone discoloration.

To achieve a high quality capacitor discharged weld, the contact pressure and the weld energy are carefully controlled. Only after a predetermined axial force or contact pressure has been reached is the energy stored in the capacitors discharged and welding begins. The energy pulse duration ranges from 4 to 15 milliseconds. The energy pulse is characterized by a sharp rise during the first 1-4 milliseconds followed by an exponential current attenuation. The weld energy is focused in the contact region and the parts fuse nearly immediately. Toward the end of the welding pulse, a somewhat pronounced austenizing process occurs via heat conduction in the regions adjacent to the weld zone. Rapid cooling induces martensitic transformation.

With cast irons, a low hardness and austenitic structure is observed in the weld flash. It has a fine dendritic cellular structure with cementite at the grain boundaries of the supersaturated solid solutions. This phenomenon seems to be due to the high cooling rate and extreme overheating of the molten material in the short austenized state of the weld area, which is important for the welding action. As such, particular carbides with a high melting point are no longer dissolved. Thus, supersaturation is excluded and the hardness will not exceed base material values.

The capacitor discharge weld technique of the present disclosure makes it possible to weld a large assortment of materials. While an interconnection between cast iron and low carbon steel has been described, materials including beryllium, tungsten, molybdenum and other high melting-point materials may be joined using capacitor discharge welding. The extremely short pulse duration permits welding high electric and thermal conductivity materials such as copper, bronze, silver, steel, nickel and platinum. It is also possible to weld refractory materials such as tantalum and molybdenum, as well as titanium. Thick or thin material combinations suitable for capacitor discharge welding include stainless steel, conventional steels, alloy steels, brass, nickel and most hard metals.

The capacitor discharge weld operation may be monitored for quality and process reliability by measuring the upset of the projection as indicated by the distance adapter ring 16 and trailing arm 12 move toward one another during the welding process. The measured projection upset is compared with minimum and maximum tolerances to determine if the part should be accepted. By monitoring weld parameters and pertinent weld characteristics, an efficient quality monitoring system may be implemented to assure high-quality welds. The weld quality monitoring system may measure parameters including weld energy, weld force, peak currents, time integral of weld current, pre-weld height measurement and weld upset.

Once adapter ring 16 has been welded to trailing arm 12, first electrode 74 and second electrode 78 are removed. Tube 14 is now positioned such that outer cylindrical surface 68 of pilot 54 engages inner cylindrical surface 70 of tube 14. Also, end face 72 of tube 14 is placed into engagement with land 56.

At this time, tube 14 and adapter ring 16 are fixed to one another via a typical welding process such as MIG or TIG welding. To allow the use of standard welding techniques between adapter ring 16 and tube 14, adapter ring 16 may be constructed from a low to medium carbon steel having a maximum of 0.28 percent carbon content. Alternate attachment processes including laser welding, riveting or adhesive bonding may also be used to fix tube 14 to adapter ring 16.

While a trailing arm and tube interconnection has been described in detail, it should be appreciated that the capacitor discharge welding process used in conjunction with an adapter ring may be applied to any number of vehicle structural assemblies including cast iron components such as steering knuckles, brackets or brake spiders being coupled to high strength steel components such as torsion bars, tie rods or links, among other combinations.

The capacitor discharge welding process produces a superior diffusion-type weld with the consistency and high production rate of resistance welding. Capacitor discharge welding results in metal bonding without distortion or discoloration and with minimal part heating. Base material strengths are achieved even for vast thermal conductivity variations or dimensional differences. Welding parameters such as contact pressure, weld energy and projection shape are precisely controllable and repeatable. Process variations may be detected by monitoring the weld energy, weld force, peak current, pre-weld height and upset distance so that post-weld inspections are not needed to assure weld quality.

Furthermore, the foregoing discussion discloses and describes merely exemplary embodiments of the present invention. One skilled in the art will readily recognize from such discussion, and from the accompanying drawings and claims, that various changes, modifications and variations may be made therein without departing from the spirit and scope of the invention as defined in the following claims.

What is claimed is:

1. A method of assembling a suspension component for a vehicle, the method comprising:
   aligning a cast iron body with a low carbon steel adapter ring;
   engaging a protrusion of the adapter ring with a face of the body;
   discharging a capacitor through the interface of the protrusion and the face to cause a portion of the protrusion to enter a plastic state;
   forcing the body and the adapter ring toward one another to weld the adapter ring to the body; and
   mounting a tube constructed from a material different than the adapter ring to the adapter ring.

2. The method of claim 1 wherein the protrusion is shaped as an uninterrupted ring.

3. The method of claim 2 wherein a cross-section of the protrusion is triangularly shaped.

4. The method of claim 3 wherein a contact circle between the body and the adapter ring is defined at an intersection of two legs of the triangularly shaped cross-section.

5. The method of claim 4 wherein an included angle between the two legs ranges between 30 and 90 degrees.

6. The method of claim 1 further including welding the tube to the adapter ring after the adapter ring has been capacitor discharge welded to the body.

7. The method of claim 6 wherein welding the tube to the adapter ring includes laser welding.

8. The method of claim 1 further including engaging an inner circumferential surface of the tube with a pilot portion of the adapter ring.

9. The method of claim 8 wherein the pilot portion has an outer diameter less than an outer diameter of the adapter ring.

10. The method of claim 1 further including engaging an end face of the tube with a land formed on the adapter ring.

11. The method of claim 1 further including passing a first electrode through an aperture formed in the adapter ring, electrically connecting the first electrode to the body, electrically connecting a second electrode to the adapter ring and discharging the capacitor through the first and second electrodes.

12. The method of claim 1 further including discharging the capacitor in 4 to 15 milliseconds.

13. The method of claim 1 further including pressing out plasticized adapter ring material to allow the adapter ring and the body to move toward one another.

14. The method of claim 1 wherein the tube is constructed from 22MnB5 material.

* * * * *